(12) United States Patent
Ishii et al.

(10) Patent No.: US 12,517,732 B2
(45) Date of Patent: Jan. 6, 2026

(54) PROCESSOR WITH ONE OR MORE PROGRESSIVE CONSERVATIVE EXECUTION MODES

(71) Applicant: Tenstorrent USA, Inc., Austin, TX (US)

(72) Inventors: Yasuo Ishii, Palo Alto, CA (US); Miles Robert Dooley, Austin, TX (US); Dongjie Xie, Austin, TX (US); Manan R Salvi, San Jose, CA (US); Alexander C. Rucker, Santa Clara, CA (US); Ashok T Venkatachar, Fremont, CA (US); Deepak Panwar, Austin, TX (US)

(73) Assignee: Tenstorrent USA, Inc.

( * ) Notice: Subject to any disclaimer, the term of this patent is extended or adjusted under 35 U.S.C. 154(b) by 0 days.

(21) Appl. No.: 18/773,632

(22) Filed: Jul. 16, 2024

(65) Prior Publication Data
US 2025/0298621 A1    Sep. 25, 2025

Related U.S. Application Data

(60) Provisional application No. 63/569,035, filed on Mar. 22, 2024.

(51) Int. Cl.
*G06F 9/38* (2018.01)
*G06F 9/30* (2018.01)
(52) U.S. Cl.
CPC ........ *G06F 9/3802* (2013.01); *G06F 9/30189* (2013.01); *G06F 9/3861* (2013.01)

(58) Field of Classification Search
CPC ............................ G06F 9/3802; G06F 9/30189
See application file for complete search history.

(56) References Cited

U.S. PATENT DOCUMENTS

| | | |
|---|---|---|
| 2007/0294507 A1 | 12/2007 | Veidenbaum et al. |
| 2012/0066482 A1 | 3/2012 | Gonion |

(Continued)

OTHER PUBLICATIONS

International Search Report and Written Opinion from International Application No. PCT/US25/20901 dated Jun. 5, 2025, 19 pages.

*Primary Examiner* — Michael J Metzger
(74) *Attorney, Agent, or Firm* — Daylight Law, P.C.

(57) ABSTRACT

Systems and methods related to a processor with one or more progressive conservative execution modes and an aggressive mode are disclosed herein. The aggressive execution mode makes a set of assumptions regarding the workloads for the processor, while each conservative execution mode is predicated on a smaller set of assumptions than the aggressive mode. The conservative execution modes may be progressive in that each progressive conservative execution mode is associated with a different quantity of assumptions. While operating in the aggressive mode, the processor can realize certain benefits in terms of speed of execution or reduced resources needed to execute the workloads. While executing instructions in an aggressive execution mode, a processor can detect that an assumption is incorrect for at least one instruction and can accordingly transition to a conservative execution mode (that may not make that assumption) to execute the instruction.

30 Claims, 8 Drawing Sheets

(56) References Cited

U.S. PATENT DOCUMENTS

| | | |
|---|---|---|
| 2015/0341218 A1* | 11/2015 | Chen ................... G06F 15/177 |
| | | 709/220 |
| 2016/0259644 A1 | 9/2016 | Brandt et al. |
| 2017/0228326 A1* | 8/2017 | Depeyrot ............ G06F 12/1408 |
| 2017/0286304 A1* | 10/2017 | Peled .................. G06F 12/0897 |
| 2017/0315815 A1 | 11/2017 | Smith et al. |
| 2018/0173535 A1* | 6/2018 | Batley .................. G06F 9/3802 |
| 2020/0310808 A1 | 10/2020 | Chen et al. |
| 2020/0372129 A1 | 11/2020 | Gupta |
| 2021/0191722 A1 | 6/2021 | Annamalai et al. |
| 2021/0406027 A1 | 12/2021 | Vorbach |
| 2021/0406183 A1* | 12/2021 | Mashimo ............ G06F 12/0862 |
| 2022/0027467 A1 | 1/2022 | Favor et al. |
| 2023/0205286 A1 | 6/2023 | Hu et al. |

* cited by examiner

PROCESSOR WITH ONE OR MORE PROGRESSIVE CONSERVATIVE EXECUTION MODES

CROSS REFERENCE TO RELATED APPLICATIONS

This application claims the benefit of U.S. Provisional Patent Application No. 63/569,035, filed Mar. 22, 2024, which is incorporated by reference herein in its entirety for all purposes.

BACKGROUND

Designing computer processors to effectively handle a wide range of workloads necessitates the incorporation of diverse and often redundant resources, a phenomenon that can be viewed as somewhat wasteful. The inclusion of extra resources serves the purpose of ensuring adaptability and responsiveness to the ever-evolving landscape of computing demands, providing users with a versatile platform capable of handling diverse tasks effectively. Given the multitude of applications and tasks that modern computing systems must accommodate, processor architects strive to create versatile designs capable of efficiently executing various instructions. Consequently, these processors may feature additional resources that are not frequently utilized, contributing to degraded performance, increased power consumption, and manufacturing costs. The challenge lies in striking a balance between specialization for specific workloads and the need for a general-purpose architecture.

Processors adhering to the RISC-V standard, like any other versatile architecture, grapple with the challenge of accommodating numerous workloads and the associated trade-offs outlined in the previous paragraph. RISC-V processors, designed based on a Reduced Instruction Set Computing (RISC) philosophy, aim for simplicity and efficiency by employing a smaller set of instructions that execute in a single clock cycle. However, in order to address the wide spectrum of computing tasks, these processors may still incorporate additional resources, despite their RISC-based foundation. The need to support diverse workloads and maintain compatibility with various software applications may lead to the inclusion of supplementary features that, in some instances, go underutilized, resulting in an increased risk of wastefulness in terms of power consumption and hardware complexity. The ongoing challenge for RISC-V designers lies in navigating the delicate balance between simplicity and the demand for flexibility in the face of an ever-expanding array of computing workloads.

The challenges described above are particularly acute for processors that are required to meet a standard set by an external organization, such as the RISC-V standard, because the standards are generally written to support a broad range of computing tasks beyond those being focused on by the designers of a particular processor.

SUMMARY

This disclosure relates to systems and methods related to computer processors with one or more progressive conservative execution modes and an aggressive mode. The aggressive mode may make certain assumptions regarding the workloads for the processor. A first conservative mode may make fewer assumptions regarding the workloads than the aggressive mode. A second conservative mode may make fewer assumptions (e.g., no assumptions) regarding the workloads than the first conservative mode. By working within assumptions, the processor may be able to perform the workloads faster or with reduced resources than working without assumptions would perform. The processor may transition to a conservative execution mode upon detecting that the current execution mode is not able to successfully execute the instruction. For example, while executing instructions for a workload of the processor in the aggressive execution mode, the processor can detect that an assumption is incorrect for at least one instruction. In response to detecting that an assumption is incorrect, the processors can transition to a conservative execution mode (e.g., the first conservative mode or the second conservative mode) that does not make the incorrect assumption. The processor can then execute, in the conservative execution mode, the instruction with appropriate assumptions.

In specific embodiments of the invention, the conservative execution modes can be progressive in that each time the processor detects that an assumption is incorrect, the processor can transition to a progressive conservative mode which makes fewer assumptions than the mode in which the processor detected that the assumption was incorrect. As the number of assumptions decreases, the efficiency of the processor is increasingly impacted, and there is a benefit to continuing to execute instructions with the most assumptions possible. At the same time, there is an efficiency overhead associated with detecting that assumptions are incorrect, transitioning to a new mode, and executing an instruction in that new mode. Accordingly, the use of progressive conservative modes provides the processor with more flexibility in terms of balancing efficiency against the risk that execution of an instruction will render an assumption incorrect and require transitioning to a new mode to execute an instruction. In specific embodiments in which the processor is a standard-compliant processor, a conservative execution mode can be fully compliant with the standard and be configured to execute any instruction or workload required by the specification.

In specific embodiments of the invention, a method for executing an instruction using a processor is provided. The method comprises: fetching the instruction for execution in an aggressive mode, wherein the aggressive mode operates using one or more assumptions regarding the instruction; detecting that one of the one or more assumptions is incorrect by one of: (i) evaluating the instruction with decode logic; and (ii) evaluating a state of the processor after execution of the instruction in the aggressive mode; and in response to detecting that one of the one or more assumptions is incorrect: (i) cancelling the execution of the instruction if one of the one or more assumptions was detected to be incorrect by evaluating the instruction with decode logic; (ii) transitioning the processor to a conservative mode; and (iii) executing the instruction in the conservative mode; wherein the conservative mode operates without at least one of the one or more assumptions.

In specific embodiments of the invention, an apparatus is provided. The apparatus comprises: one or more processors; and a non-transitory computer-readable medium storing instructions. The non-transitory computer-readable medium, when executed by the one or more processors, causes the one or more processors to conduct a method for executing an instruction. The method comprises: fetching the instruction for execution in an aggressive mode, wherein the aggressive mode operates using one or more assumptions regarding the instruction; detecting that one of the one or more assumptions is incorrect by one of: (i) evaluating the instruction with decode logic; and (ii) evaluating a state of the one or more processors after execution of the instruction in the aggressive mode; and in response to detecting that one of the one or more assumptions is incorrect: (i) cancelling the execution of the instruction if one of the one or more assumptions was detected to be incorrect by evaluating the instruction with decode logic; (ii) transitioning the one or more processors to a conservative mode; and (iii) executing the instruction in the conservative mode; wherein the conservative mode operates without at least one of the one or more assumptions.

In specific embodiments of the invention, a method for executing an instruction using one or more processors is provided. The method comprises: fetching the instruction for execution in an aggressive mode, wherein the aggressive mode operates using a set of assumptions regarding the instruction; detecting that at least one first assumption of the set of assumptions is incorrect by at least one of: (i) evaluating the instruction before execution of the instruction; (ii) evaluating a state of the one or more processors after partial execution of the instruction in the aggressive mode; and (iii) evaluating a state of the one or more processors after full execution of the instruction in the aggressive mode; transitioning, based at least in part on detecting that the at least one first assumption of the set of assumptions is incorrect, the one or more processors to a conservative mode, wherein the conservative mode operates without at least one second assumption of the set of assumptions; and executing, based at least in part on transitioning the one or more processors to the conservative mode, the instruction in the conservative mode.

BRIEF DESCRIPTION OF THE DRAWINGS

The accompanying drawings illustrate various embodiments of systems, methods, and embodiments of various other aspects of the disclosure. A person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Figure 1:
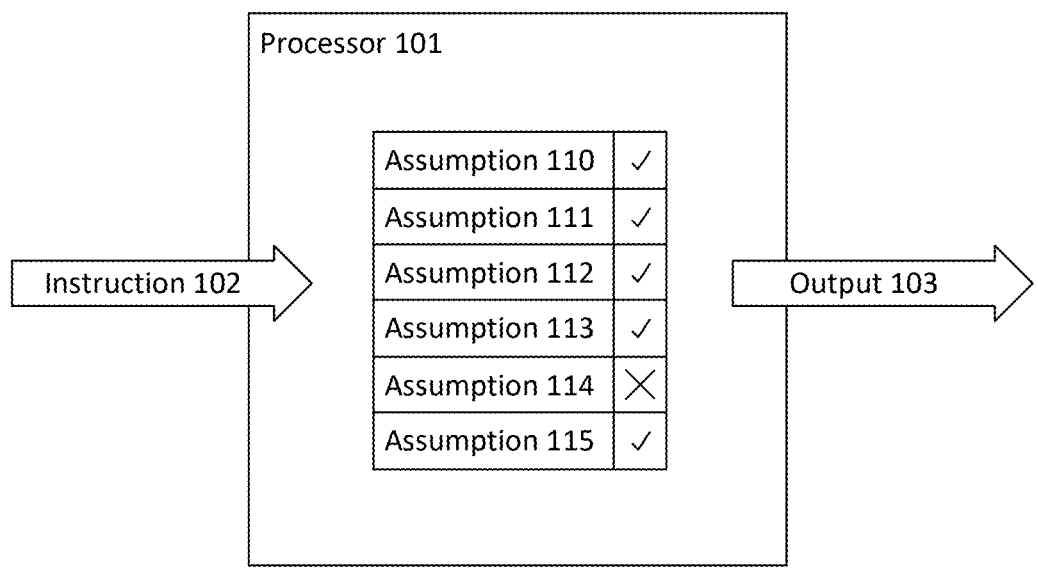
FIG. 1 provides an example of a system with a processor operating with assumptions in accordance with specific embodiments of the inventions disclosed herein.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Different systems and methods for a processor with one or more progressive conservative execution modes in accordance with the summary above are described in detail in this disclosure. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

Systems and methods related to computer processors are disclosed herein. In specific embodiments, the processors include one or more conservative execution modes. The one or more conservative execution modes can be conservative with respect to an aggressive execution mode that makes certain assumptions regarding the workloads for the processor. Based on these assumptions, the processor can realize certain benefits in terms of speed of execution or reduced resources needed to execute the workloads. While executing instructions for a workload of the processor in an aggressive execution mode, a processor can detect that an assumption is incorrect for at least one instruction. In response to detecting that an assumption is incorrect, the processors can transition to a conservative execution mode. The processor can then execute, in the conservative execution mode, the instruction which would have rendered the assumption incorrect in the aggressive execution mode.

As compared to an aggressive execution mode, a conservative execution mode can be predicated on a smaller set of assumptions regarding the workload of the processor. In specific embodiments, the conservative execution mode can make no assumptions regarding the workload of the processor. In specific embodiments in which the processor is a standard-compliant processor, the conservative execution mode can be fully compliant with the standard and be configured to execute any instruction or workload required by the specification. In specific embodiments, the conservative execution mode can make assumptions regarding the workload of the processor but can make fewer assumptions regarding the workload of the processor than the mode in which the assumption was found to be incorrect.

In specific embodiments of the invention, the conservative execution modes can be progressive in that each time the processor detects than an assumption is incorrect, the processor can transition to a progressive conservative mode which makes fewer assumptions than the mode in which the processor detected that the assumption was incorrect. As the number of assumptions decreases, the efficiency of the processor is increasingly impacted, and there is a benefit to continuing to execute instructions with the most assumptions possible. At the same time, there is an efficiency overhead associated with detecting that assumptions are incorrect, transitioning to a new mode, and executing an instruction in that new mode. Accordingly, the use of progressive conservative modes provides the processor with more flexibility in terms of balancing efficiency against the risk that execution of an instruction will render an assumption incorrect and require transitioning to a new mode to execute an instruction.

In specific embodiments, processors can transition to a conservative execution mode upon detecting that the current execution mode has or will incorrectly execute the instruction. For example, the processors may detect that an assumption will be rendered incorrect by the execution of an instruction (i.e., before execution of an instruction) or the detection that an assumption has been rendered incorrect by the execution of the instruction (i.e., after full or partial execution of the instruction). The detection of an incorrect assumption may involve the explicit detection that an assumption will be or has been violated (e.g., through the use of logic circuits which are specifically designed to throw flags to indicate an assumption has been violated). The detection of an incorrect assumption may also involve an implicit detection that an assumption has been violated (e.g., by detecting that an error has occurred through the execution of the instruction using logic or debug circuits which are designed to detect errors in the execution of instructions or the state of the processor).

In specific embodiments, the processors could transition to a conservative execution mode upon detecting that an assumption of a prior execution mode was violated. For example, the processor could determine that an assumption would be rendered incorrect by analyzing the instruction such as by using a decoder or specialized logic circuits that are tasked with evaluating instructions or evaluating instructions in light of a state of the processor. As another example, the processor could determine that an assumption would be rendered incorrect by detecting an error in the execution of an instruction which is indicative of an instruction being rendered incorrect. In specific embodiments, the processors could transition to a conservative execution mode upon detecting an error (i.e., without that error indicating a specific assumption was incorrect).

In specific embodiments, the processor can detect both that an assumption has been or will be rendered incorrect, and which assumption has been or will be rendered incorrect. Alternatively, in specific embodiments, the processor will only detect that an assumption has been or will be rendered incorrect, but it will not detect which assumption was rendered incorrect. What information is detected can impact what the processor does in response to detecting that the assumption was rendered incorrect.

In specific embodiments, the processor can perform various operations in response to detecting that an assumption was rendered incorrect. If the instruction had already been executed, the processor could modify its state so that the execution of the instruction is reversed (e.g., the execution of the instruction could be cancelled and the state of the processor could be reset to the state it was in just prior to the execution). Regardless, the processor can transfer to a conservative execution mode (i.e., either to a conservative mode from an aggressive mode or to a progressive conservative mode from a more aggressive conservative mode). If the processor detected which assumption was violated, the processor could transition to a conservative mode which did not make that particular assumption. However, the processor could also transition to a more conservative mode that did not make other assumptions in order to provide more certainty that the execution of the instruction would not render any assumptions incorrect and could proceed without further interruption. If the processor did not detect which assumption was violated, the processor could transition to a conservative mode which did not make an assumption that is most likely to have been rendered incorrect by the execution, or a group of assumptions that are most likely to have been rendered incorrect by the execution. However, the processor could also transition to a more conservative mode that did not make any assumptions in order to provide more certainty that the execution of instruction could proceed further without interruption. The processor may redo the instruction that is associated with the incorrect assumption.

FIG. 1 illustrates an example of system 100 with processor 101 operating with assumptions as described herein. Processor 101 may fetch instruction 102. Processor 101 may attempt to execute instruction 102 using assumptions 110, 111, 112, 113, 114, and 115 to produce output 103. Processor 101 may detect that assumption 114 is incorrect (for example, by detecting certain occurrences or errors). Processor 101 may be a part of an apparatus or other system.

In specific embodiments of the invention, processor 101 may first execute or attempt to execute instruction 102 in an aggressive mode or a progressive conservative mode. Processor 101 may then detect that an assumption (e.g., assumption 114) is incorrect and may accordingly cancel the execution of instruction 102. Processor 101 may then start (e.g., transition to) a more conservative mode and restart or fetch the same instruction 102 again for execution in the more conservative mode.

In specific embodiments of the invention, processor 101 can be configured to detect that an assumption (e.g., assumption 114) was violated by detecting certain occurrences. While some of these occurrences relate specifically to RISC-V processor architectures (the processor may be compatible with RISC-V), unless otherwise specified these occurrences are applicable to processors generally. The occurrences include processor 101 trying to take a fault or error on a load or store operation, speculatively resynchronizing the last micro-operation, attempting to execute a speculative resynchronization to the last micro-operation, attempting to execute a load/store operation for IO (input/output) memory, executing a fault-only-first vector load instruction that updates a vector length (VL) register only when an exception is detected, executing an operation with the value in the VL register equal to zero, executing an operation with a value in a Vstart register not equal to zero, updating a specified configuration register, and many other potential occurrences in a processor architecture. As used herein, terms such as VL register and Vstart refer to their meanings within the RISC-V standard. Furthermore, an equation or prose which states that a register is equal to a certain value refers to the register holding data which indicates that value. Based on one or more of these occurrences, processor 101 may determine that at least one assumption is incorrect.

In specific embodiments, processor 101 may determine that one or more assumptions is incorrect and may accordingly perform an operation. For example, processor 101 may determine that one of assumptions 110, 111, 112, 113, 114, or 115 is incorrect without determining which assumption is incorrect specifically. In specific embodiments, processor 101 may determine which assumption is incorrect. For example, processor 101 may determine that assumption 114 specifically is incorrect. Although assumption 114 is shown as incorrect in system 100, any assumption or combination of assumptions (including more than one assumption) may be incorrect depending on instruction 102, assumptions 110 through 115, and system 100. In specific embodiments, processor 101 may detect the combination of assumptions 110 through 115 that are incorrect.

In specific embodiments, processor 101 may perform various operations in response to detecting that an assumption (e.g., assumption 114) was rendered incorrect. If instruction 102 has already been executed to produce output 103, processor 101 may modify its state so that the execution of instruction 102 is reversed (e.g., the execution of instruction 102 may be cancelled and the state of processor 101 may be reset to the state it was in just prior to the execution) and output 103 may be discarded. In specific embodiments, processor 101 may detect that an assumption is incorrect before execution of instruction 102 or after partial execution of instruction 102.

Regardless of when processor 101 detects that an assumption is incorrect, processor 101 may transfer to a conservative execution mode (i.e., either to a conservative mode from an aggressive mode or to a progressive conservative mode from a more aggressive conservative mode). Processor 101 may refetch the instruction to attempt to execute it in the progressive conservative mode. If processor 101 detected which assumption was violated, processor 101 may transition to a conservative mode which did not make that particular incorrect assumption. In other specific examples, processor 101 may transition to a more conservative mode that does not make other assumptions that may be likely to be incorrect based on the particular incorrect assumption. Processor 101 may transition to this more conservative mode in order to provide more certainty that the execution of instruction 102 will not render any assumptions (e.g., assumptions 110 through 115) incorrect and execution will be able to proceed without further interruption due to incorrect assumptions. In other specific examples, processor 101 may transition to a conservative mode that does not make any assumptions in order to provide more certainty that the execution of instruction 102 will not render any assumptions incorrect and execution will be able to proceed without further interruption due to incorrect assumptions.

If processor 101 did not detect which assumption of assumptions 110 through 115 was violated, processor 101 may determine which assumption(s) were the most likely to have been rendered incorrect. Processor 101 may then transition to a conservative mode which does not make the assumption(s) that are most likely to have been rendered incorrect by the execution. In specific embodiments, processor 101 may transition to a conservative mode that does not make any assumptions in order to provide more certainty that the execution of instruction 102 will proceed further without interruption due to incorrect assumptions.

In specific embodiments, processor 101 may have an architecture capable (e.g., have all the hardware necessary) to complete instruction 102 without any assumptions. Executing, or attempting to execute, instruction 102 in a first mode (e.g., aggressive mode) may use a set of hardware components of processor 101. Executing, or attempting to execute, instruction 102 in a second mode (e.g., conservative mode) may use a different set of hardware components, for example a set of hardware components that was not used in the first mode. For example, processor 101 may have architecture to efficiently execute instruction 102 in a first mode (e.g., with assumptions) and in a second mode (e.g., without assumptions).

In specific embodiments, processor 101 may not have an architecture that easily executes instruction 102 without any assumptions. Executing, or attempting to execute, instruction 102 in a first mode (e.g., aggressive mode) may use the same set of hardware components that processor 101 used for executing, or attempting to execute, instruction 102 in a second mode (e.g., conservative mode). Processor 101 may execute instruction 102 in a more complicated way without the assumption (e.g., incorrect assumption 114) than the way processor 101 would have executed instruction 102 if the assumption were correct. For example, system 100 may not include specialized hardware for edge cases and may assume the edge cases will not happen. When generating one or more operation sequences to execute instruction 102 in the first mode, an assumption (e.g., that an edge case will not happen) may be rendered incorrect. In order to execute instruction 102 without the assumption (e.g., execute the edge case), processor 101 may transition to the second mode and insert additional operations to work around a lack of specialized hardware, may force an instruction dependency, or both. These additional operations may not be used in a system that includes the specialized hardware for dealing with the edge case. Instead of executing instruction 102 directly, processor 101 may generate, insert, and execute one or more operation sequences (with or without a forced dependency) that leads to the same result as executing the original instruction 102 but requires additional operations than executing instruction 102 directly. In the second mode, processor 101 may perform extra operations, use more power, and/or take more time to execute instruction 102, compared to an architecture having a set of hardware components for the second mode. For example, processor 101 may have architecture to efficiently execute instruction 102 in a first mode (e.g., with assumptions) but to inefficiently execute instruction 102 in a second mode (e.g., without assumptions). Assuming that the conservative mode will not be used (and certain assumptions will be true) may allow a smaller hardware architecture where special portions of circuitry dedicated to handling edge cases are not included. Without the special portions of circuitry, the processor may be inefficient at handling edge cases. If, however, the edge cases are not expected to occur often (e.g., only during boot up) then the tradeoff of smaller circuitry at the expense of speed of a few rare operations may be beneficial. Generally, by implementing progressive conservative modes, the processor may balance efficiency via making correct assumptions and efficiency via avoiding incorrect assumptions.

Figure 2:
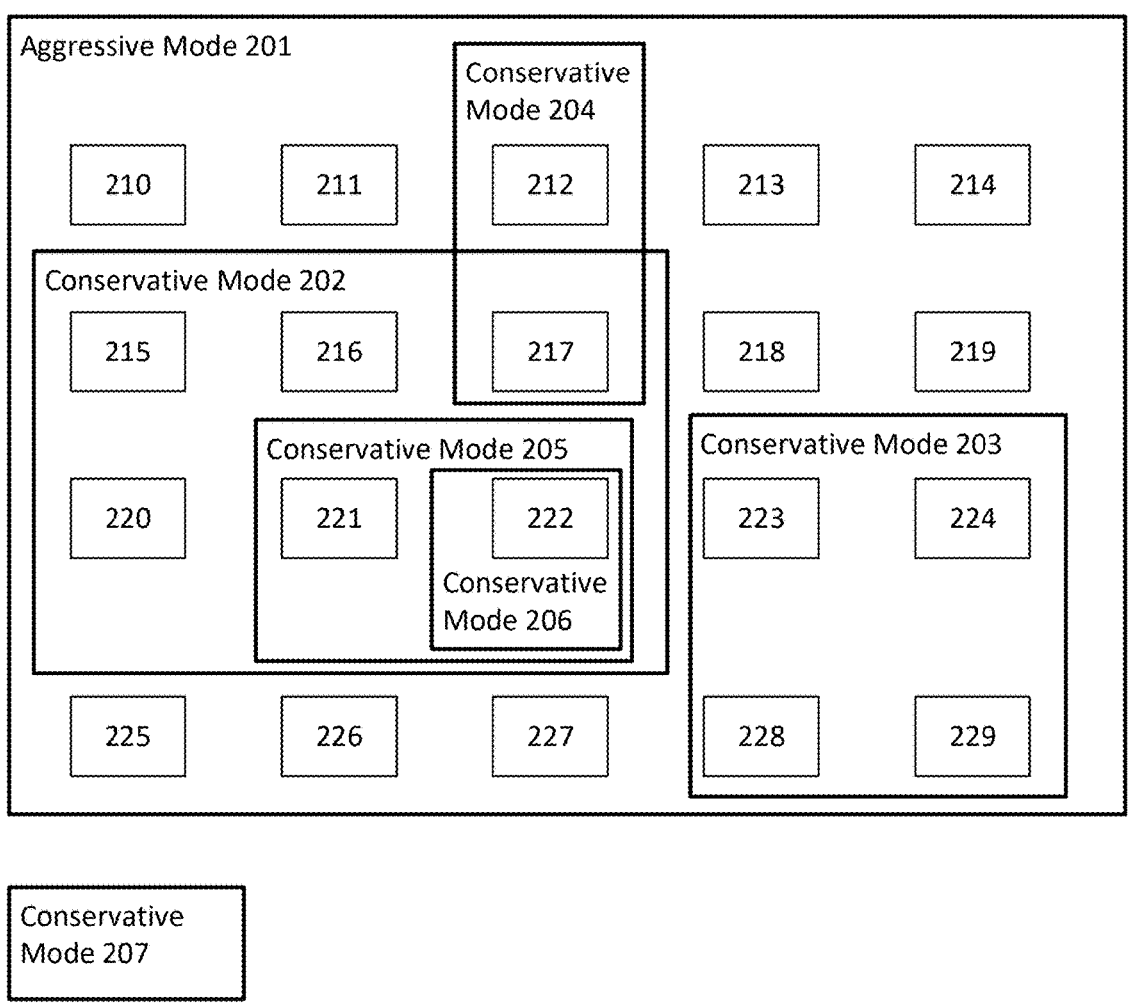
FIG. 2 provides an example of a system of assumptions organized into an aggressive mode and progressive conservative modes in accordance with specific embodiments of the inventions disclosed herein.

FIG. 2 illustrates an example of a system 200 of assumptions 210 through 229 organized into modes including aggressive mode 201 and progressive conservative modes 202, 203, 204, 205, 206, and 207. Different modes may correspond to different combinations of assumptions 210 through 229. For example, aggressive mode 201 (e.g., aggressive execution mode) may make all assumptions 210 through 229. Conservative modes 202 through 206 (e.g., conservative execution modes) may each make only some of the assumptions 210 through 229. Conservative mode 207 may make no assumptions at all. System 200 is only an example of how different assumptions may be grouped into different modes. System 200 may be implemented with any quantity of assumptions, system 200 may be implmented with any quantity of progressive conservative and aggressive modes, the progressive and conservative modes may group assumptions in ways not shown, and progressive and conservative modes may not group assumptions in every way that is shown.

Aggressive mode 201 and conservative modes 202 through 207 may be implemented by one or more processors. Conservative modes 202 through 207 may be conservative with respect to aggressive mode 201 that makes certain assumptions (e.g., assumptions 210 through 229) regarding the workloads for the one or more processors. In specific embodiments, conservative modes 202 through 206 may make assumptions regarding the workload of the one or more processors but may make fewer assumptions regarding the workload of the one or more processors than the mode in which the assumption was found to be incorrect. Based on these assumptions, the one or more processors may realize certain benefits in terms of speed of execution or reduced resources needed to execute the workloads. While executing instructions for a workload of the processor in aggressive mode 201, the one or more processors may detect that an assumption is incorrect for at least one instruction. In response to detecting that an assumption is incorrect, the processors can transition to a conservative mode (e.g., one of conservative modes 202 through 207). The one or more processors may then execute, in the conservative mode, the instruction which would have rendered the assumption incorrect in aggressive mode 201.

Conservative modes 202 through 206 may overlap in which assumptions they share. Conservative mode 202 may make a portion of the assumptions made by aggressive mode 201, for example, assumptions 215, 216, 217, 220, 221, and 222. Conservative mode 203 may make a portion of the assumptions made by aggressive mode 201 that corresponds to a different portion than conservative mode 202. For example, conservative mode 203 may make assumptions 223, 224, 228, and 229. Conservative mode 204 may overlap with conservative mode 204 to make assumption 217 while also making assumption 212 that conservative mode 202 does not make.

Conservative modes may be nested inside each other. Conservative mode 205 may make a portion of the assumptions, for example assumptions 221 and 222, that conservative mode 202 makes. Conservative mode 206 may make a portion of the assumptions, for example assumption 222, that conservative mode 205 makes. In this way, conservative modes may progressively make fewer assumptions. Conservative mode 207 may not make any assumptions. In specific embodiments in which the processor is a standard-compliant processor, conservative mode 207 may be fully compliant with the standard and be configured to execute any instruction or workload required by the specification.

In specific embodiments of the invention, assumptions 210 through 229 made by aggressive mode 201 may relate to a particular instruction set architecture (ISA) where assumptions 210 through 229 are that certain aspects of the ISA will not be used. In these embodiments, one or more conservative modes 202 through 206, or most conservative mode 207, from the set of progressive conservative modes 202 through 207 may be fully compliant with the ISA while aggressive mode 201 is not. In specific embodiments, the ISA will be the RISC-V ISA or the RISC-V vector extension ISA. The one or more processors may be compatible with the RISC-V ISA.

Assumptions 210, 211, 213, 214, 218, 219, 225, 226, and 227 may be unique to aggressive mode 201. In specific embodiments, more assumptions (not shown) may be possible, where aggressive mode 201 does not make those assumptions. Some conservative modes may make only one assumption. For example, conservative mode 206 may only make assumption 222.

Assumptions within conservative modes may be organized according to how likely the assumptions are to be true. For example, assumption 210 may be incorrect more often than assumption 221 and therefore fewer modes (e.g., only aggressive mode 201) make assumption 210 than modes (e.g., aggressive mode 201, conservative mode 202, and conservative mode 205) make assumption 221. Some assumptions may be more grouped together due to the likelihood of one assumption affecting the other. For example, if assumption 223 being incorrect means that assumption 224 is more likely to be incorrect, then both assumption 223 and assumption 224 may be grouped into the same mode (e.g., conservative mode 203). If assumption 215 being incorrect means that assumption 228 is more likely to be correct (and vice versa), then assumption 215 may be part of a different mode than assumption 228 (e.g., conservative mode 202 makes assumption 215 but not assumption 228, while conservative mode 203 makes assumption 228 but not assumption 215).

In specific embodiments, while executing instructions for a workload of one or more processors in aggressive mode 201, the one or more processors may detect that assumption 210 is incorrect for at least one instruction. In response to detecting that assumption 210 is incorrect, the processors can transition to conservative mode 202, which does not make assumption 210. The one or more processors may then execute, in conservative mode 202, the instruction. In specific embodiments, while executing the instruction (or a subsequent instruction in the workload of the processor) in conservative mode 202, the one or more processors may detect that assumption 220 is incorrect for at least one instruction. In response to detecting that assumption 220 is incorrect, the processors may transition to conservative mode 205, which does not make assumption 220. The one or more processors may then execute, in conservative mode 205, the instruction. The process of transitioning through progressive conservative modes may continue as the processors execute, or attempt to execute, each instruction in the workload.

In specific embodiments, while executing instructions for a workload of one or more processors in aggressive mode 201, one or more processors may detect that assumption 221 is incorrect for at least one instruction. In response to detecting that assumption 221 is incorrect, the processors can transition to conservative mode 206 or conservative mode 203, which do not make assumption 221. The processor may refrain from transitioning to conservative mode 202 or conservative mode 205 as both these modes make assumption 221. The one or more processors may then execute, in conservative mode 206 or conservative mode 203, the instruction.

In specific embodiments, while executing instructions for a workload of one or more processors in aggressive mode 201, one or more processors may detect that an assumption is incorrect for at least one instruction, but may not detect which assumption is incorrect. In response to detecting that an assumption is incorrect, the processors evaluate which assumption is most likely to be incorrect (e.g., assumption 210) and may transition to a conservative mode (e.g., conservative mode 202), which does not make that assumption. The one or more processors may then execute, in the conservative mode, the instruction.

In specific embodiments, while executing instructions for a workload of one or more processors in aggressive mode 201, one or more processors may detect an assumption is incorrect for at least one instruction. In response to detecting that an assumption is incorrect, the processors may determine which assumption is incorrect or may proceed without determining which specific assumption is incorrect. The processors may transition to conservative mode 207, which does not make any assumptions. The processors may refrain from transitioning to intermediate progressive conservative modes (e.g., conservative modes 202 through 206) to ensure that the processors are able to execute the instruction regardless of which assumption is incorrect, or which assumption may be incorrect (if any) in subsequent instructions of the workload. The one or more processors may then execute, in conservative mode 207, the instruction.

In specific embodiments of the invention, the one or more processors may take various actions in a conservative mode (e.g., conservative modes 202 through 207) that may not be taken in aggressive mode 201. The actions may either reduce or eliminate the chances of an error occurring in response to a specific type of instruction or they may provide a service or feature that is not often used. These actions may be taken in response to determining that an assumption was incorrect, where the incorrect assumption is that the aforementioned specific type of instruction will not be executed or that the aforementioned service or feature will not be used. Specific examples of these types of actions include that: the one or more processors will be put into a state where it will decompose all memory instructions into small pieces (e.g., the smallest pieces possible), the one or more processors will be put into a state where they will force all memory instructions to be executed in sequence instead of allowing for out of order execution, the one or more processors will be put into a state where they may write to a certain processor state (e.g., vector length register), and the one or more processors will be put into a state where they can merge old data and new data in a register file or configuration register. The one or more processors may also redo the instruction associated with the incorrect instruction or reset the state of the one or more processors (e.g., to the state previous to the failed instruction).

A conservative mode (e.g., of conservative modes 202 through 207) may also involve decode logic which generates operation sequences to execute instructions that render the assumptions incorrect using the hardware available to the one or more processors. This may involve inserting additional operations or forcing an instruction dependency to correctly execute the instruction regardless of the architecture state. In specific embodiments, conservative modes 202 through 207 may thereby execute the instructions less efficiently than an architecture that is specifically designed to handle instructions that render the assumptions incorrect. However, so long as the use of the conservative mode is relatively limited, the decreased efficiency of the conservative mode is offset by the lower resource consumption and efficiency of aggressive mode 201.

Conservative modes 202 through 207 may differ from aggressive mode 201, and from each other, in various ways. Each conservative mode may take various approaches to avoiding errors. For example: a first conservative mode could decompose memory instructions into the smallest pieces possible, force all memory instructions to be executed in sequence instead of for allowing out-of-order execution, and let some specific instruction update a certain processor state (e.g., vector length register) only in the conservative mode. A second conservative mode may use a different combination of these approaches. A third conservative mode may use approaches not taken by the first conservative mode. A fourth conservative mode may use a combination of approaches taken by the first conservative mode and of approaches not taken by the first conservative mode.

In specific embodiments, aggressive mode 201 (and one or more conservative modes 202 through 206) may make one or more of the following assumptions: execution of an instruction won't involve detecting any exceptions, execution of an instruction won't access IO memory, instructions won't be executed with a value of zero in the VL register, instructions won't be executed with a non-zero value in the Vstart register, and instructions won't cause read-after-read ordering violations. Using this approach, aggressive mode 201 will be able to operate more efficiently, such as by bypassing holds that wait for the merge operation described with reference to the figure above, conducting out of order execution of vector gather operations, and assuming certain registers have predetermined values (e.g., Vstart register has 0) to avoid the need to check those values, etc.

Figure 3:
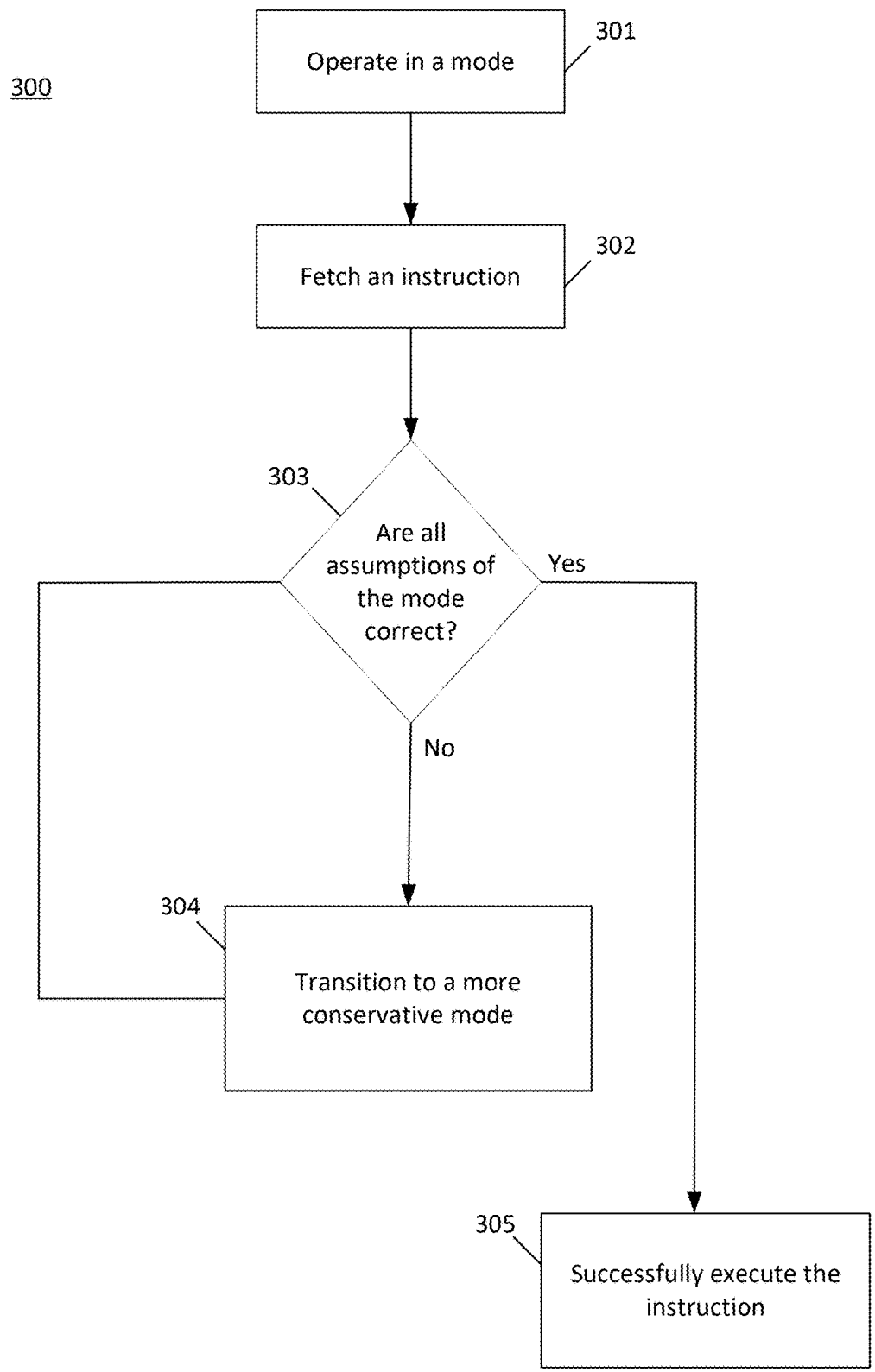
FIG. 3 provides an example of a flowchart of a processor using one or more progressive execution modes in accordance with specific embodiments of the inventions disclosed herein.

FIG. 3 illustrates a flowchart 300 of an operation of a processor (or more than one processor) using one or more progressive conservative execution modes in accordance with specific embodiments of the invention disclosed herein.

At 301, the processor may operate in a mode. The mode may be the aggressive mode (for example, aggressive mode 201) or a conservative mode (for example, conservative modes 202 through 207). The processor may have successfully executed an instruction or set of instructions in this mode, or may have transitioned to this mode (e.g., conservative mode 202 through 207) as a result of failing to execute an instruction, or may have transitioned to this mode (e.g., aggressive mode 201 or conservative mode 202 through 206) as a result of a successfully executing an instruction.

At 302, the processor may fetch an instruction. The instruction may be part of a workload of the processor and may be part of a set of instructions. The instruction may be a normal or common instruction, or may include an edge case scenario. The workload may be a typical workload or may be a workload not often utilized (or expected to be utilized) by the processor.

At 303, the processor may detect whether all the assumptions of the mode are correct. The processor may determine only that an assumption was incorrect or may determine which assumption, of a set of assumptions made by the mode, is incorrect. More than one assumption may be incorrect. The processor may determine that an assumption is incorrect before the execution, after partial execution, or after full execution of the instruction. If one or more assumptions are incorrect, then the processor may transition to a more conservative mode at 304. If all the assumptions of the mode are correct, then the processor may successfully execute the instruction at 305.

In specific embodiments, assumptions may include: execution of an instruction won't involve detecting any exceptions, execution of an instruction won't access IO memory, instructions won't be executed with a value of zero in the VL register, instructions won't be executed with a non-zero value in the Vstart register, and instructions won't cause read-after-read ordering violations. In specific embodiments, an assumption may include that a specific type of instruction will not be executed (e.g., certain portions on an ISA will not be used), for example instructions involving a partial update of a vector register file, resumption of an instruction using a value in Vstart, and a fault only first vector load instruction. If the assumptions are correct, the aggressive mode (and one or more progressive conservative modes that make the associated assumptions) will be able to operate more efficiently, such as by bypassing holds that wait for the merge operation described with reference to the figure above, conducting out of order execution of vector gather operations, and assuming certain registers have predetermined values (e.g., Vstart register has 0) to avoid the need to check those values, etc.

In specific embodiments, at 303, the processor may detect that the current execution mode has or will incorrectly execute the instruction. For example, the processor may detect that an assumption will be rendered incorrect by the execution of an instruction (i.e., before execution of an instruction) or the detection that an assumption has been rendered incorrect by the execution of the instruction (i.e., after full or partial execution of the instruction). The detection of an incorrect assumption may involve the explicit detection that an assumption will be or has been violated (e.g., through the use of logic circuits which are specifically designed to throw flags to indicate an assumption has been violated). The detection of an incorrect assumption may also involve an implicit detection that an assumption has been violated (e.g., by detecting that an error has occurred through the execution of the instruction using logic or debug circuits which are designed to detect errors in the execution of instructions or the state of the processor).

In specific embodiments, at 303, the processor may detect that an assumption of a prior execution mode was violated. For example, the processor could determine that an assumption would be rendered incorrect by analyzing the instruction such as by using a decoder or specialized logic circuits that are tasked with evaluating instructions or evaluating instructions in light of a state of the processor. As another example, the processor may determine that an assumption would be rendered incorrect by detecting an error in the execution of an instruction which is indicative of an instruction being rendered incorrect. In specific embodiments, the processor may detect an error, without that error indicating which specific assumption made by the processor was incorrect.

In specific embodiments, at 303, the processor can detect both that an assumption has been or will be rendered incorrect, and which assumption has been or will be rendered incorrect. Alternatively, in specific embodiments, the processor may only detect that an assumption has been or will be rendered incorrect, but it will not detect which assumption was rendered incorrect. What information is detected may impact what the processor does in response to detecting that the assumption was rendered incorrect (e.g., which conservative mode the processor transitions to at 304).

In specific embodiments of the invention, the processor may be configured to detect that an assumption was violated by detecting certain occurrences. While some of these occurrences relate specifically to RISC-V processor architectures, unless otherwise specified these occurrences are applicable to processors generally. The occurrences include the processor trying to take a fault or error on a load or store operation, speculatively resynchronizing the last micro-operation, attempting to execute a speculative resynchronization to the last micro-operation, attempting to execute a load/store operation for IO memory, executing a fault-only-first vector load instruction that needs to update a vector length (VL) register only when an exception is detected, executing an operation with the value in the VL register equal to zero, executing an operation with a value in a Vstart register not equal to zero, updating a specified configuration register, and many other potential occurrences in a processor architecture.

At 304, the processor may transition to a more conservative mode. The processor may refetch the instruction in order to execute the instruction in the conservative mode. Once the processor is in a more conservative mode, then the processor may, at 303, detect whether all the assumptions of this more conservative mode are correct. If, at 303, at least one of the assumptions of the more conservative mode is still incorrect, the processor may, at 304, transition to an even more conservative mode. The process may continue until all the assumptions of the current mode are correct, in which case the processor is able to successfully execute the instruction at 305.

In specific embodiments of the invention, there are more than one conservative modes. Each conservative mode may be progressive in that each time the processor detects than an assumption is incorrect, the processor can transition to a progressive conservative mode (e.g., at 304) which makes fewer assumptions than the mode in which the processor detected that the assumption was incorrect (e.g., at 303). As the number of assumptions decreases, the efficiency of the processor is increasingly impacted, and there is a benefit to continuing to execute instructions with the most assumptions possible. At the same time, there is an efficiency overhead associated with detecting that assumptions are incorrect (e.g., at 303), transitioning to a new mode (e.g. at 304), and executing or attempting to execute an instruction in that new mode. Accordingly, the use of progressive conservative modes provides the processor with more flexibility in terms of balancing efficiency against the risk that execution of an instruction will render an assumption incorrect and require transitioning to a new mode to execute an instruction.

In specific embodiments, the processor can take various actions in response to detecting that an assumption was rendered incorrect. If the instruction had already been executed, the processor may modify its state so that the execution of the instruction is reversed (e.g., the execution of the instruction could be cancelled and the state of the processor could be reset to the state it was in just prior to the execution). Regardless, the processor can transfer to a conservative execution mode (i.e., either to a conservative mode from an aggressive mode or to a progressive conservative mode from a more aggressive conservative mode) at 304. If the processor detected which assumption was violated, the processor may transition to a conservative mode which did not make that particular assumption. However, the processor may also transition to a more conservative mode that did not make other assumptions in order to provide more certainty that the execution of the instruction would not render any assumptions incorrect and may proceed without further interruption. If the processor did not detect which assumption was violated, the processor could transition to a conservative mode which did not make an assumption that is most likely to have been rendered incorrect by the execution, or a group of assumptions that are most likely to have been rendered incorrect by the execution. However, the processor could also transition to a more conservative mode that did not make any assumptions in order to provide more certainty that the execution of instruction could proceed successfully (e.g., at 305) without interruption (e.g., another loop around 303 and 304).

After successfully executing the instruction at 305, the processor may perform various operations. After executing the instruction in a conservative mode, the processor may return to a more aggressive (e.g., less conservative) mode. In the case of a processor with progressive conservative modes, the processor could return stepwise to the aggressive execution mode through the progressive (decreasingly) conservative modes and wait to execute one or more instructions correctly (e.g., successfully) before continuing to take the next step back towards the aggressive mode (e.g., transition to a less conservative/more aggressive mode). In embodiments in which the same instruction caused the processor to step through multiple progressive conservative modes, as the same instruction was found to render numerous assumptions incorrect, the steps back to the aggressive execution mode could follow the same modes in the same order in reverse. Alternatively, in the case of a processor with progressive conservative modes, the processor could return immediately to the most aggressive execution mode after executing the instruction, or it could wait to execute one or more additional instructions correctly before returning to the most aggressive execution mode.

Figure 4:
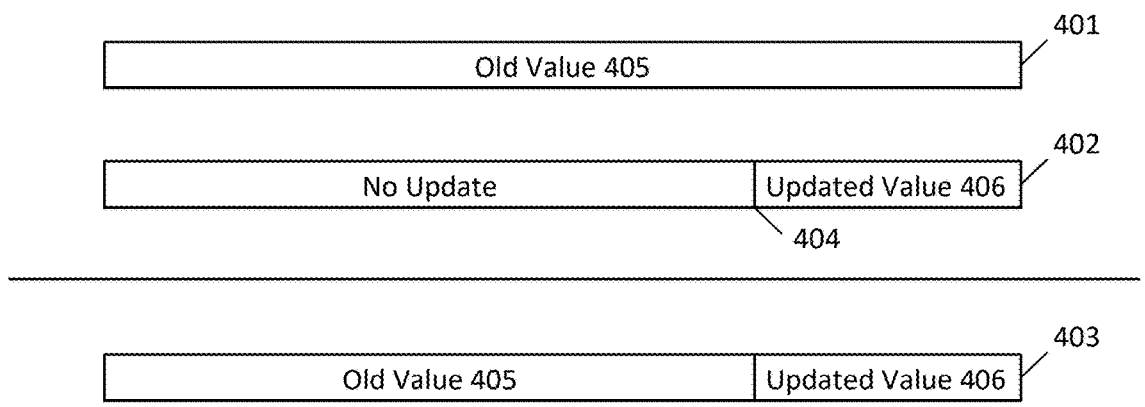
FIG. 4 provides an example of a processor executing an instruction with a register.

FIG. 4 illustrates an example of a processor executing an instruction using register 403 with exception 404 occurring in the middle of executing the instruction. The processor may have made an assumption that exception 404 would not occur in the middle of executing the instruction and that the processor would not resume the interrupted instruction execution. This assumption may be made as part of the aggressive mode or a conservative mode that makes assumptions. In specific embodiments of the invention, the assumptions made by the aggressive mode relate to a particular ISA, with the assumptions being that certain aspects of the ISA will not be used. In these embodiments, the conservative mode or the most conservative mode (e.g., a mode that makes no assumptions) from a set of progressive conservative modes may be fully compliant with the ISA while the aggressive mode is not. In specific embodiments, the ISA will be the RISC-V ISA or the RISC-V vector extension ISA.

In specific embodiments, the processor assumes that there will not be an exception or an interruption while executing an instruction. In specific embodiments, the ISA may require a partial update of the architecture state (e.g., update to a vector register file) if an exception or interruption is observed in the middle of an instruction execution. For example, when a vector load operation is executed for a 256-bit length vector instruction, a typical execution requires a full update of the entire 256-bit entry (i.e., bits [255:0] are updated). However, if an exception is detected in the middle of the instruction, the processor is expected to update only a subset of the entry (e.g., only bits [95:0] are updated while bits [255:96] retain the old value. Functionality in accordance with this example is required by the RISC-V vector extension ISA. In specific embodiments (e.g., in the aggressive mode), the processor will assume that this functionality is not required.

In specific embodiments, the processor assumes that it will not resume an instruction from the middle of executing an instruction. In specific embodiments, the ISA may require the resumption of an instruction from the middle of execution of an instruction. This functionality may require the use of a specialized register that can be referred to as a Vstart register. In keeping with the prior example in which the execution of an instruction was stopped after updating only a subset of the entry, the specialized register used for this functionality (e.g., the Vstart register in RISC-V vector extension ISA) can record the status of the prior instruction (e.g., that bits [95:0] were previously updated) and the resumption of that previously cancelled instruction can utilize the information in that register to only update the remainder of the entry (i.e., only update bits [255:96]). Functionality in accordance with this example is required by the RISC-V vector extension ISA. In specific embodiments (e.g., in the aggressive mode), the processor will assume that this functionality is not required.

In specific embodiments, the processor may assume that it will not receive a fault-only-first vector load instruction. In specific embodiments, the ISA may require the execution of a specialized instruction that can be referred to as a fault-only-first vector load instruction. This functionality may be used for the loading of a register in a specific manner in which, when a fault is detected in the middle of a register load, the processor will partially update the register up to the fault position (e.g., [63:0] of a register is updated instead of [256:0]) and a specialized register will be updated with the fault position (e.g., the register will store bits identifying 64 as the position of the fault). The specialized register can be referred to as a VL register. Functionality in accordance with this example is required by the RISC-V vector extension ISA. In specific embodiments (e.g., in the aggressive mode), the processor will assume that this functionality is not required.

The functionalities of the ISA of pausing execution of an instruction when an exception is detected, resuming the execution of the instruction, and executing a fault-only-first vector load instruction may be enabled through the use of three registers and logic for executing a merge operation. Detecting an exception and executing a fault-only-first vector load instruction may be considered occurrences. An exception 404 may occur while loading a vector to register 402. The exception (e.g., occurrence) may trigger a partial update of some registers. For example, to perform a partial update of some registers, the processor may get the value (e.g., updated value 406) in one register (e.g., register 402) and combine the value with the old value (e.g., old value 405) in another register (e.g., register 401) to make a final merged value in a new register (e.g., register 403).

Detecting an exception and executing a fault-only-first vector load instruction may be considered occurrences. As long as functionalities associated with the occurrences (for example, pausing execution of an instruction when an exception is detected, resuming the execution of the instruction, and executing a fault-only-first vector load instruction) are not needed, a vector load operation will only need to generate the updated value 406 (e.g., from register 402). As a result, the processor operating in the aggressive mode performs more efficiently, as a subsequent operation does not need to wait for the merged value to be generated (as done when the processor operates without these assumptions). As such, the aggressive mode, which assumes that the aforementioned functionalities are not needed (and the occurrences do not occur), improves the efficiency of the processor.

In specific embodiments, a processor may be operating in an aggressive mode which assumes that the vector instructions will be executed with Vstart always equal to zero, and the processor will detect that execution of the instruction necessitates that the Vstart be nonzero. For example, the processor may be executing a vector load operation with the following code: VLD, v10, [X] (ignore Vstart or assume Vstart=0). VLD is the instruction identifier, v10 is the target register, [X] is the data to be loaded from memory, and the instruction ignores Vstart or assumes Vstart is zero because it is in aggressive mode. Upon detecting the assumption is not true, the processor may enter a conservative mode. A decoder can then insert additional operations to execute the instruction differently. The code for these instructions could be VLD, Vtemp, [X] (masked by Vstart) and VMERGE v10, Vtemp, v10. Vtemp is a temporary register that is loaded with the value of X masked up to Vstart. VMERGE is the instruction identifier for an operation that will merge the values of v10 and Vtemp into register v10. Once the instruction has been accordingly executed in the conservative mode, the processor can return to the aggressive mode.

In specific embodiments, a processor may be operating in an aggressive mode which assumes that the instructions will not be executed with a fault in the middle of instruction execution, and the processor will detect that execution of the instruction is to be done without detecting fault as position Y. For example, the processor could be executing the instruction VLD.FF, v10, [X] in an aggressive mode where VLD.FF is a fault-only-first vector load instruction. Accordingly, the processor will enter a conservative mode and generate additional operations to execute the instruction. The additional operations could be VSETVLI, VL, Y (Y: faulting position) and VLD, v10, [X]. VSETVLI is the instruction identified for an instruction that sets the vector length register to a value Y, where Y is the faulting position, and after that value is set a vector load to register v10 operation will load the value X into register v10. This sequence permits the processor to safely execute vector operation up to the faulting position without detecting a fault. Once the instruction has been accordingly executed in the conservative mode, the processor can return to the aggressive mode.

Figure 5:
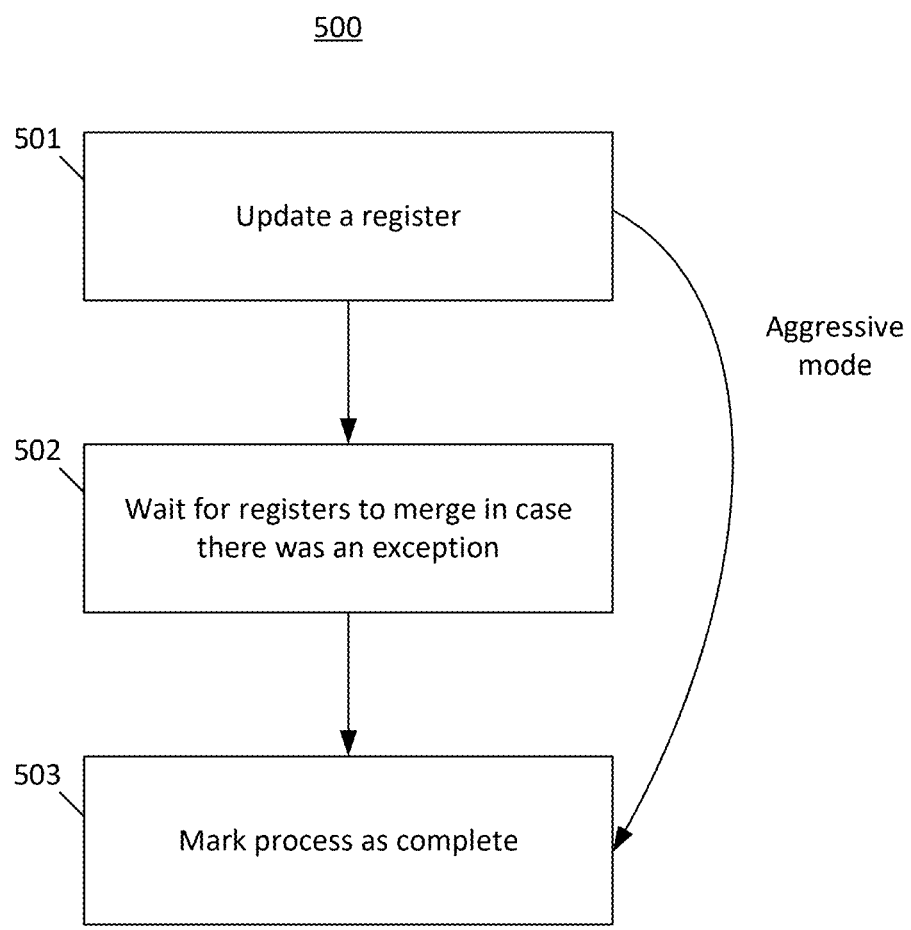
FIG. 5 provides an example of a flowchart with a processor in an aggressive mode assuming that registers will not merge when updating a register in accordance with specific embodiments of the inventions disclosed herein.

FIG. 5 illustrates an example of flowchart 500 of a processor in an aggressive mode assuming that registers will not merge when updating a register. Flowchart 500 may also be performed by multiple processors working together. At 501, the processor may update a register (e.g., as part of an instruction).

At 502, the processor may wait for multiple registers to merge in case there was an exception or an occurrence while updating the register at 501. The functionalities of the ISA of pausing execution of an instruction when an exception is detected, resuming the execution of the instruction, and executing a fault-only-first vector load instruction may be enabled through the use of multiple registers and logic for executing a merge operation. Detecting an exception and executing a fault-only-first vector load instruction may each be considered occurrences. If an occurrence occurs, then the processor may wait for registers to merge before marking a process (e.g., the task of loading a vector) complete. In a conservative mode, the processor may wait a duration of time associated with merging registers whether or not an occurrence triggered separate vectors merging.

At 503, the processor may mark the process of updating the register as complete. In the aggressive mode, the processor may skip 502 and go to 503 from 501. For example, the processor may assume that multiple registers do not need to merge (e.g., because the processor assumes that no exceptions or occurrences will occur) and may not wait a duration associated with multiple registers merging before marking the process as complete.

Detecting an exception and executing a fault-only-first vector load instruction may be considered occurrences. As long as functionalities associated with the occurrences (for example, pausing execution of an instruction when an exception is detected, resuming the execution of the instruction, and executing a fault-only-first vector load instruction) are not needed, a vector load operation will not need to wait for multiple registers to merge. As a result, the processor operating in the aggressive mode performs more efficiently, as a subsequent operation does not need to wait for the merged value to be generated (as done when the processor operates without these assumptions in a conservative mode). As such, the aggressive mode, which assumes that the aforementioned functionalities are not needed (and the occurrences do not occur), improves the efficiency of the processor.

In specific embodiments, the processor can determine that an instruction will require an exception or a value of zero in a VL register. In response, the processor may implement a conservative mode that holds for the merge operations described above. Once the instruction has been accordingly executed in the conservative mode, the processor can return to the aggressive mode.

Figure 6:
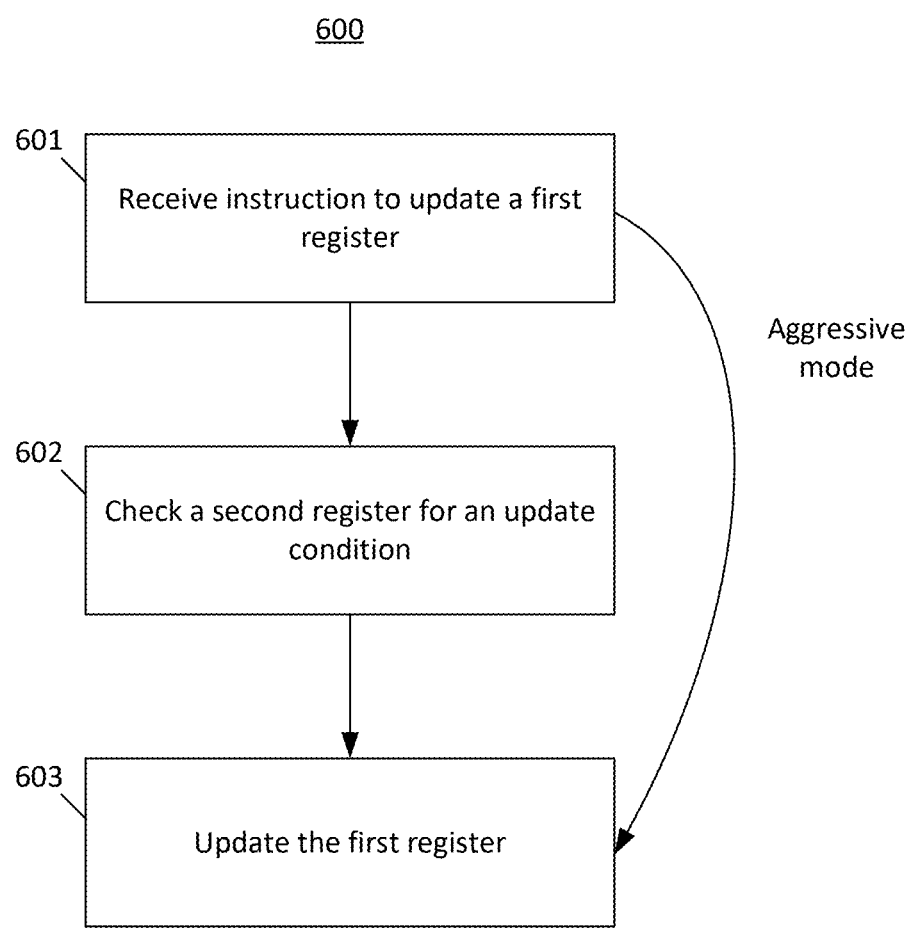
FIG. 6 provides an example of a flowchart with a processor in an aggressive mode assuming that a register will not be updated based on a current architecture state in accordance with specific embodiments of the inventions disclosed herein.

FIG. 6 illustrates an example of flowchart 600 with a processor in an aggressive mode assuming that a register will not be updated based on a current architecture state. In other words, the processor in the aggressive mode may update the register regardless of (not based on) the current architecture state. In specific embodiments, the ISA may require conditionally not updating a register (e.g., vector register) based on a current architecture state (e.g., stored in an architectural register or VL register). The architectural state may be set by having a specific value in a specific register. For example, the register could be an architectural register which can be referred to as a VL register and the value to set this condition could be a value of zero. Functionality in accordance with this example is required by the RISC-V vector extension ISA. In specific embodiments, the aggressive mode will assume that this functionality is not required. For example, the processor may refrain from checking the value in the architectural register corresponding to the current architecture state because the processor already assumes that the register will be updated based on the instruction. In other words, the processor may refrain from checking the value in the architectural register because the processor assumes that the current state of the architecture is to update the register based on the instruction, rather than, for example, holding onto a previous value of the register.

At 601 the processor may receive an instruction to update a first (e.g., vector, v1) register. For example, the update may be part of a vector addition (VADD) instruction (v1<=v2+v3), which may assign a new physical register and the new first register (e.g., v1 register) to have a value generated from the instruction (e.g., v2+v3). In specific embodiments, the current first register value (e.g., the first value of the first register) does not affect the generated value (e.g., the second value of the first register, the value that results from the instruction).

In a conservative mode, at 602, the processor may check the value of a second (e.g., architectural, VL) register for an update condition. The value of the second register may indicate whether or not to update the first (e.g., vector) register according to the received instruction. For example, if the value of the second register is zero, then the first register may hold its first value, rather than the second value generated from the instruction (e.g., the result of v2+v3).

At 603, the processor may update the first register. In the aggressive mode, the processor may assume that the value of the second register indicates to update the first register based on the instruction received at 601 without actually checking the second register (e.g., the aggressive mode skips 602). The aggressive mode may not refer to (e.g., refrain from checking) a value of the first register before the first register is updated. If, in the conservative mode, the processor checks the second register for the update condition (at 602), and the value indicates to update the first register according to the received instruction (e.g., the value of the second register is not zero), then the first register may be updated according to the received instruction. If, in the conservative mode, the processor checks the second register for the update condition (at 602), and the value indicates to refrain from updating the first register according to the received instruction (e.g., the value of the second register is zero), then the processor may refrain from updating the first register according to the received instruction and instead hold the value previously stored in the first register, even if the received instruction gets executed. For example, the value of the first register before receiving the instruction to update the register (before 601) may be the same as the value of the first register after it is updated (at 603).

In specific embodiments, the processor can determine that an instruction will require an exception or a value of zero in a VL register. In response, the processor may implement a conservative mode that checks the VL register for an update condition. Once the instruction has been accordingly executed in the conservative mode, the processor can return to the aggressive mode.

In specific embodiments, the aggressive mode may allow for reordering instructions or for parallel processing. For example, the processor may receive four instructions: a first instruction VADD v1<=v2+v3, a second instruction VST v1=> [x10+0], a third instruction VSUB v1<=v4–v5, and a fourth instruction VST v1=> [x10+32]. In this example, the first instruction VADD and the third instruction VSUB have no dependency. However, in the conservative mode, the processor may wait to execute the third instruction VSUB until the first instruction VADD is complete, in case the VL register is zero. The processor waits for the first instruction VADD to complete because, if the VL register is zero, then the third instruction VSUB may keep the current value of v1 (which is dependent on the first instruction VADD) rather than rewrite v1 to be the result of v4 minus v5. However, if the processor assumes that VSUB (or any other instruction) will not keep the current value of v1, then the processor may execute the first instruction VADD and the second instruction VSUB out of order or in parallel. Accordingly, the processor may operate more efficiently in the aggressive mode.

Figure 7:
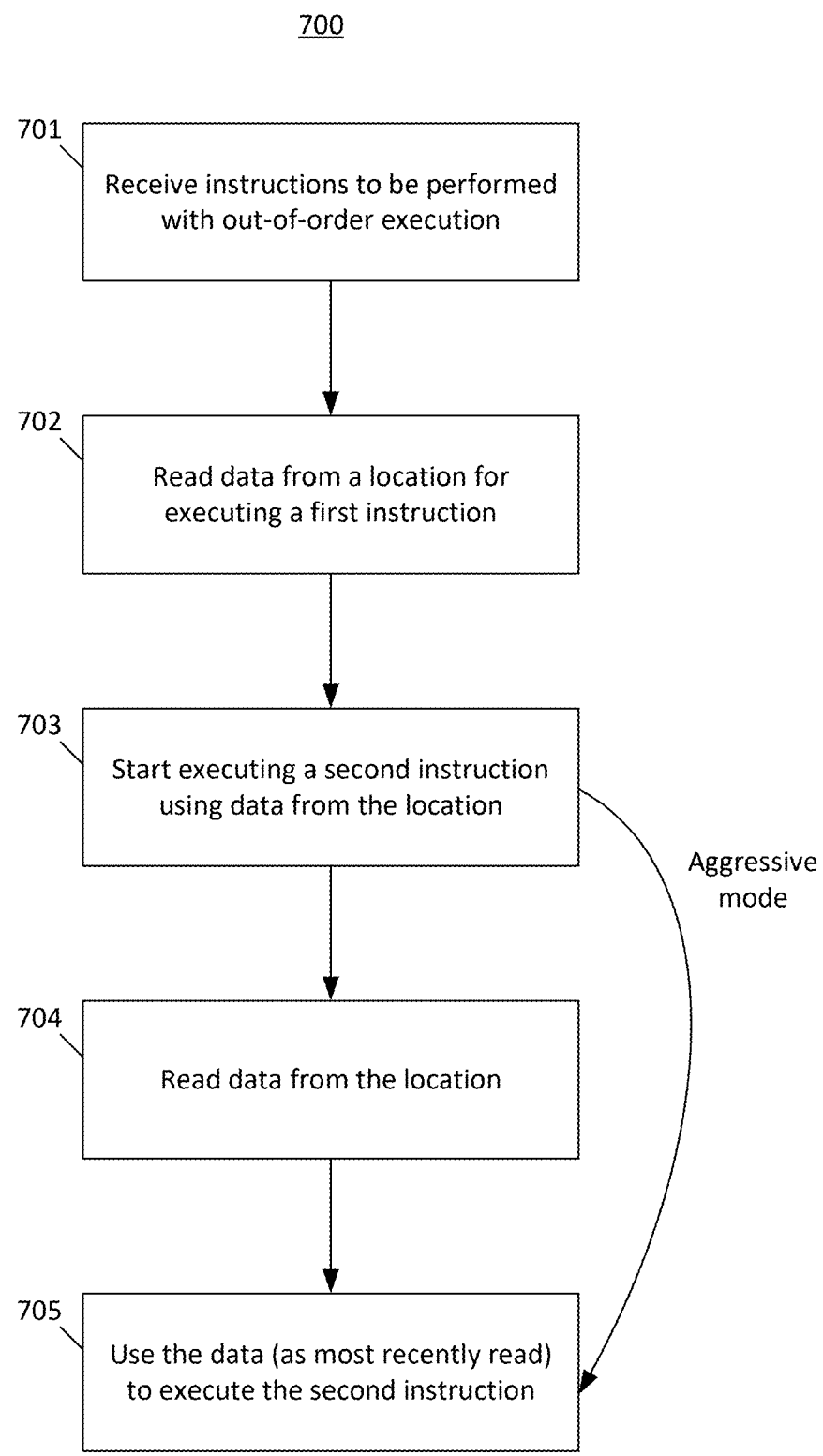
FIG. 7 provides an example of a flowchart with a processor in an aggressive mode assuming that data from a given location will not change between reads while performing out-of-order executions of instruction in accordance with specific embodiments of the inventions disclosed herein.

FIG. 7 illustrates an example of flowchart 700 with a processor in an aggressive mode assuming that data from a given location will not change between reads while performing out-of-order executions of instruction. In specific embodiments, the ISA may render the processor susceptible to live lock from intra-instruction dependency if the instructions are executed out-of-order. For example, for a vector gather operation (or Vector Index Load instruction in RISC-V Vector Extension), the processor may be susceptible to read-after-read errors in which data from a given location is read a first time and is changed (e.g., by a snoop operation) before it is read for a second time. Protection against this occurrence may be required for out-of-order execution of instructions using a RISC-V vector extension ISA (e.g., by prohibiting out-of-order execution of specific instructions). In specific embodiments, the aggressive mode will not provide this protection. In other words, the aggressive mode will assume this protection is not needed.

At 701, the processor may receive a set of instructions to be performed with an out-of-order execution. These instructions may refer to data in a given location multiple times.

At 702, the processor may read data from a location for executing a first instruction of the set of instructions. The processor may execute the instruction using the data.

At 703, the processor may begin executing a second instruction of the set of instructions. The second instruction may also use the data from the location.

In a conservative mode, at 704, the processor may reread the data from the location. The processor may reread the data because the execution of the first instruction, a snoop operation, etc., may have changed the data at the location.

At 705, the processor may use the data (as most recently read) to execute the second instruction. In a conservative mode, the data may have been most recently read at 704. In the aggressive mode, the data may have been most recently read at 702 (as part of executing the first instruction). For example, the processor (in the aggressive mode) may not re-read data at the location while executing the second instruction, instead assuming that the data has not changed between when it was read last (e.g., at 702) and when it is used next (e.g., at 705). Accordingly, the processor may save time and operate more efficiently.

In specific embodiments, the processor can determine that an instruction will result in the potential for a read-after-read error. In response, the processor may implement a conservative mode that prevents out-of-order execution of vector load operations. In this conservative mode, the instruction scheduling logic will wait until the re-order buffer (ROB) becomes empty before dispatching the instruction to the out-of-order execution engine. After the instruction gets dispatched, subsequent operation waits until the instruction gets retired before being dispatched. Once the instruction has been accordingly executed in the conservative mode, the processor can return to the aggressive mode.

In specific embodiments, the processor can determine that an instruction may lead to a read-after-read error, or some other error associated with out of order execution. In response, the processor may implement a conservative mode where the unit processing load/store operations will only be permitted to execute a load or store operation when the operation is the oldest unexecuted operation (e.g., a vector load/store instruction may generate many scalar load operations to fill a vector element and the unit processing load/store operations will execute load operations only when the load operation is the oldest unresolved operation in the processor). If the unit processing load/store operations detects an exception at element N, this information can be broadcasted to the entire processor. If the unit processing load/store operations detects an exception at element N, subsequent memory access can be masked off (i.e., return a dummy value without accessing the memory). The processor can also operate in a conservative mode in which the vector unit will administrate the Vstart register and the exception location (N) reported from the unit processing load/store operations to merge the old value and the new value. Once the instruction has been accordingly executed in the conservative mode, the processor can return to the aggressive mode.

Figure 8:
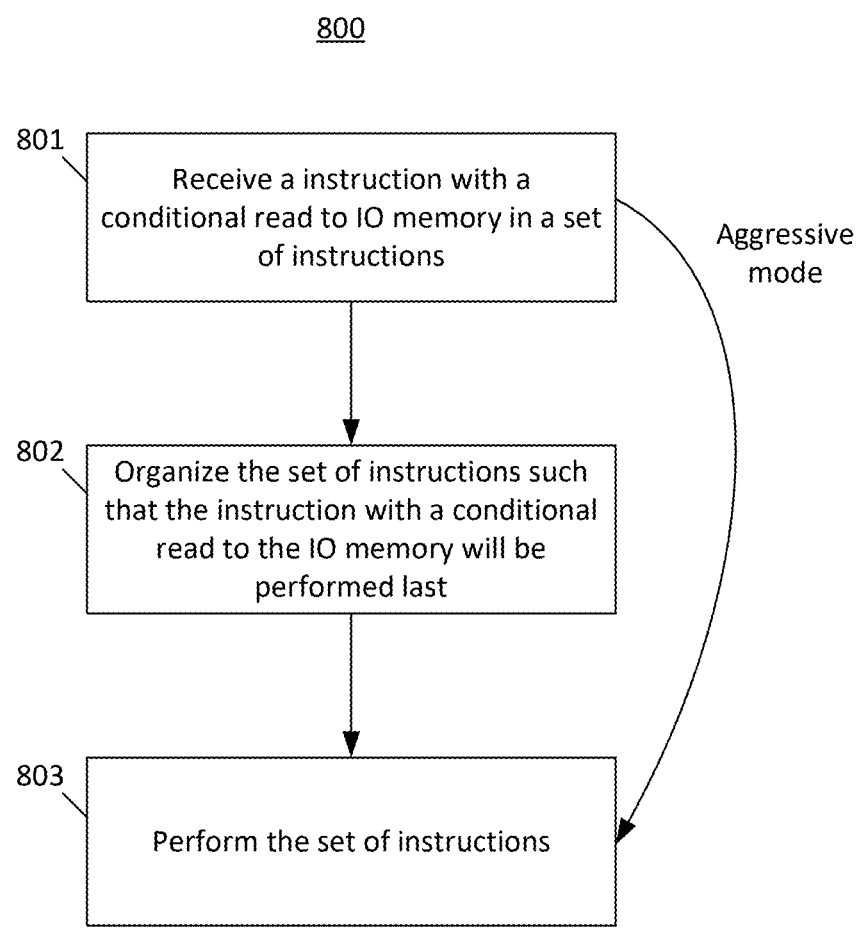
FIG. 8 provides an example of a flowchart with a processor in an aggressive mode assuming that vector load instructions or conditional load instructions will not access input/outut (IO) memory in accordance with specific embodiments of the inventions disclosed herein.

FIG. 8 illustrates an example of flowchart 800 with a processor in an aggressive mode assuming that vector load instructions or conditional load instructions will not access IO memory. In specific embodiments, the ISA may not permit speculative memory access (e.g., accessing memory in bulk for purposes of obtaining a subset of the accessed data or accessing memory subject to conditions that are subsequently met and render the memory access unnecessary) for specific memory types. For example, the ISA might not permit speculative memory access to IO memory regions to avoid unintended modification of the state of IO devices. The ISA might not allow vector load operations from IO memory for purposes of selecting subsets of data because the bulk access operations may make IO access to the location which is not intended to be accessed by an instruction. This access may lead to an unintended modification of the state of IO devices.

In specific embodiments, the aggressive mode will assume that vector load instructions or conditional load instructions will never need to access the IO memory. Upon detecting a violation of this assumption, the aggressive mode may prevent vector load operations from accessing IO memory to avoid speculative memory access and fetching the bulk data. In these embodiments, the aggressive mode will benefit from the processor not needing to detect that there will be a conditional read to IO memory.

At 801, the processor may receive a set of instructions with one (or more) of the instructions including a conditional read to IO memory.

In a conservative mode, at 802, the processor may organize the set of instructions such that the instruction with a conditional read to the IO memory will be performed last out of the set of instructions. For example, in some standard RISC-V compliant processors, load operations involving IO memory are not allowed to be executed until they are the oldest instruction holding to be executed. Using this approach, it can be assured that the load operation will not be conditionally cancelled. However, this requirement slows down the processor as it reduces opportunities for parallelism and out of order execution.

At 803 the processor may perform the set of instructions. In the conservative mode, the set of instructions may be organized such that the instruction with a conditional read to the IO memory will be performed last out of the set of instructions (e.g., at 802). In the aggressive mode, the processor may assume that the IO memory will not be read. In other words, the processor may treat the conditions for the instruction to read to the IO memory as not being met. Accordingly, an aggressive mode that makes the assumption that the conditions for reading to the IO memory will not be met during the execution of the set of instructions can avoid the need for the standard protection against this type of error and thereby operate more efficiently. In specific embodiments, the aggressive mode will assume that instructions (e.g., such as vector load operations) never access IO memory.

The examples of assumptions provided herein are assumptions that are usually true except for during initialization time and/or are usually true through the bulk of most workloads that would utilize a processor. Accordingly, the aggressive mode is likely to provide adequate functionality through the course of execution of a typical workload and it is unlikely that the execution of an instruction will need to be repeated with a more conservative mode of operation activated.

In specific embodiments, a processor can be compliant with a RISC-V standard and be configured to operate in an aggressive mode which has one or more of the following assumptions: execution of an instruction won't involve detecting any exceptions, execution of an instruction won't access IO memory, instructions won't be executed with a value of zero in the VL register, instructions won't be executed with a non-zero value in the Vstart register, and instructions won't cause read-after-read ordering violations. Using this approach, the aggressive mode will be able to operate more efficiently, such as by bypassing holds that wait for the merge operation described with reference to the figure above, conducting out of order execution of vector gather operations, and assuming certain registers have predetermined values (e.g., Vstart register has 0) to avoid the need to check those values, etc.

In specific embodiments, a RISC-V compliant processor can be configured to determine if any instructions would violate the aforementioned assumptions and alter the operation of the processor to a more conservative mode which did not make one or more of these assumptions. The execution of the instruction can be cancelled before proceeding to update the state of the processor. The detection can be done in various locations depending upon which assumption is being monitored. For example, an instruction decoder can determine that Vstart is not equal to zero, and integer execution unit can detect that the VL register has a zero value, or a load store unit can detect IO memory access, exceptions, and potential access ordering violation. The processor can enter conservative mode when a re-fetched (or restarted) instruction is processed by the instruction decode stage.

In specific embodiments, the processor could then be configured to determine if the instruction would violate a new set of assumptions and alter the operation of the processor to an even more conservative mode which did not make one or more additional assumptions from the original set of assumptions. In specific embodiments, the processor can be configured to determine which assumptions the instruction would violate and select a conservative mode that did not make those assumptions. A stepwise approach to reducing the assumptions made by the progressive conservative modes can mitigate the reduction in efficiency experienced by the processor.

In specific embodiments, the processor can implement a specific conservative mode in which in the midcore (i.e., an instruction sequence unit with responsibility to cancel instructions if an exception happens) can commit instruction even if the instruction detects an exception. In this conservative mode, this won't cause incorrect instruction execution since instruction sequence from other units (e.g., load/store unit and the vector unit) will guarantee correct architecture state.

At least one processor in accordance with this disclosure can include at least one non-transitory computer readable media. The at least one processor could comprise at least one computational node in a network of computational nodes. The media could include cache memories on the processor. The media can also include shared memories that are not associated with a unique computational node. The media could be a shared memory, could be a shared random-access memory, and could be, for example, a double data rate (DDR) dynamic random-access memory (DRAM). The shared memory can be accessed by multiple channels. The non-transitory computer readable media can store data required for the execution of any of the methods disclosed herein, the instruction data disclosed herein, and/or the operand data disclosed herein. The computer readable media can also store instructions which, when executed by the system, cause the system to execute the methods disclosed herein. The concept of executing instructions is used herein to describe the operation of a device conducting any logic or data movement operation, even if the "instructions" are specified entirely in hardware (e.g., an AND gate executes an "and" instruction). The term is not meant to impute the ability to be programmable to a device.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by one or more processors operating with a computer-readable non-transitory medium storing instructions for those method steps. The computer-readable medium may be memory within a personal user device or a network accessible memory. Although examples in the disclosure were generally directed to RISC-V ISA, the same approaches could be utilized to comply with other standards while boosting efficiency. These and other modifications and variations to the present invention may be practiced by those skilled in the art, without departing from the scope of the present invention, which is more particularly set forth in the appended claims.

What is claimed is:

1. A method for executing an instruction using a processor, comprising:
fetching the instruction for execution in an aggressive mode, wherein the aggressive mode operates using one or more assumptions regarding the instruction;
detecting that one of the one or more assumptions is incorrect by one of: (i) evaluating the instruction with decode logic; and (ii) evaluating a state of the processor after execution of the instruction in the aggressive mode;
in response to detecting that one of the one or more assumptions is incorrect: (i) cancelling the execution of the instruction if one of the one or more assumptions was detected to be incorrect by evaluating the instruction with decode logic; (ii) transitioning the processor to a conservative mode; and (iii) executing the instruction in the conservative mode;
transitioning, based at least in part on executing the instruction, to a third mode;
fetching a second instruction; and
executing, based at least in part on fetching the second instruction, the second instruction in the third mode;
wherein the conservative mode operates without at least one of the one or more assumptions.

2. The method of claim 1, further comprising:
refetching the instruction in order to execute the instruction in the conservative mode;
detecting that one of the one or more assumptions is still incorrect by one of: (i) evaluating the instruction with decode logic after refetching the instruction; and (ii) evaluating a state of the processor after execution of the instruction in the conservative mode; and
in response to detecting that one of the one or more assumptions is still incorrect: (i) cancelling the execution of the instruction in the conservative mode; (ii) transitioning the processor to a more conservative mode; and (iii) executing the instruction in the more conservative mode.

3. The method of claim 1, wherein:
the processor is compatible with a RISC-V vector extension and allows for a set of functionalities comprising: (i) a partial updating of an architectural register; and (ii) a conditional updating of a second architectural register; and
the one or more assumptions include an assumption that the set of functionalities will not be utilized.

4. The method of claim 1, wherein:
the processor is compatible with a RISC-V vector extension and allows for intra-instruction memory access ordering violations; and
the one or more assumptions include an assumption that the intra-instruction memory access ordering violations will not happen.

5. The method of claim 1, wherein:
executing the instruction in the aggressive mode comprises using a first set of hardware components while refraining from using a second set of hardware components; and
executing the instruction in the conservative mode comprises using the second set of hardware components and refraining from using the first set of hardware components.

6. The method of claim 1, wherein executing the instruction in the conservative mode comprises:
generating operation sequences to execute operations that render the one or more assumptions incorrect;
inserting one or more additional operations not used to execute the instruction in the aggressive mode; and
forcing an instruction dependency.

7. The method of claim 1, wherein detecting that one of the one or more assumptions is incorrect comprises:
setting a flag to indicate that the detected assumption of the one or more assumptions is incorrect.

8. The method of claim 1, wherein detecting that one of the one or more assumptions is incorrect further comprises:
identifying, from a set of assumptions, an identified incorrect assumption.

9. The method of claim 8, further comprising:
selecting, based on the identified incorrect assumption, the conservative mode from a set of conservative modes, wherein the conservative mode does not make the identified incorrect assumption.

10. The method of claim 1, further comprising:
identifying, from a set of assumptions, one or more assumptions that are likely to be incorrect; and
selecting, based on the identified one or more assumptions that are likely to be incorrect, the conservative mode from a set of conservative modes, wherein each conservative mode of the set of conservative modes makes a different combination of assumptions, and the conservative mode does not make the one or more assumptions that are likely to be incorrect.

11. The method of claim 1, further comprising:
fetching a third instruction; and
executing, based at least in part on fetching the third instruction and before transitioning to the third mode, the third instruction in the conservative mode.

12. The method of claim 1, wherein:
the third mode is the aggressive mode.

13. The method of claim 1, further comprising:
selecting the conservative mode from a set of conservative modes, wherein each conservative mode of the set of conservative modes are associated with a different combination of features, wherein the features include a combination of: (i) decomposing memory instructions into small pieces; (ii) forcing memory instructions to be executed in sequence; (iii) allowing updates to processor states; and (iv) merging old data and new data in a register file or a configuration register.

14. The method of claim 1, wherein:
the one or more assumptions correspond to assuming that the execution of the instruction will not involve: (i) detecting any exceptions; (ii) accessing input/output memory; (iii) a value of zero in a first register; (iv) a non-zero value in a second register; (v) read-after-read ordering violations; or (vi) a combination thereof.

15. An apparatus comprising:
one or more processors; and
a non-transitory computer-readable medium storing instructions which, when executed by the one or more processors cause the one or more processors to conduct a method for executing an instruction, the method comprising:
fetching the instruction for execution in an aggressive mode, wherein the aggressive mode operates using one or more assumptions regarding the instruction;
detecting that one of the one or more assumptions is incorrect by one of: (i) evaluating the instruction with decode logic; and (ii) evaluating a state of the one or more processors after execution of the instruction in the aggressive mode;
in response to detecting that one of the one or more assumptions is incorrect: (i) cancelling the execution of the instruction if one of the one or more assumptions was detected to be incorrect by evaluating the instruction with decode logic; (ii) transitioning the one or more processors to a conservative mode; and (iii) executing the instruction in the conservative mode;
transitioning, based at least in part on executing the instruction, to a third mode;
fetching a second instruction; and
executing, based at least in part on fetching the second instruction, the second instruction in the third mode;
wherein the conservative mode operates without at least one of the one or more assumptions.

16. The apparatus of claim 15, wherein the method further comprises:
refetching the instruction in order to execute the instruction in the conservative mode;
detecting that one of the one or more assumptions is still incorrect by one of: (i) evaluating the instruction with decode logic after refetching the instruction; and (ii) evaluating a state of the one or more processors after execution of the instruction in the conservative mode; and
in response to detecting that one of the one or more assumptions is still incorrect: (i) cancelling the execution of the instruction in the conservative mode; (ii) transitioning the one or more processors to a more conservative mode; and (iii) executing the instruction in the more conservative mode.

17. The apparatus of claim 15, wherein:
the one or more processors are compatible with a RISC-V vector extension and allow for a set of functionalities comprising: (i) a partial updating of an architectural register; and (ii) a conditional updating of a second architectural register; and
the one or more assumptions include an assumption that the set of functionalities will not be utilized.

18. The apparatus of claim 15, wherein:
the one or more processors are compatible with a RISC-V vector extension and allow for intra-instruction memory access ordering violations; and
the one or more assumptions include an assumption that the intra-instruction memory access ordering violations will not happen.

19. The apparatus of claim 15, further comprising:
a first set of hardware components; and
a second set of hardware components different than the first set of hardware components;
wherein executing the instruction in the aggressive mode comprises using the first set of hardware components and refraining from using the second set of hardware components; and
wherein executing the instruction in the conservative mode comprises using the second set of hardware components and refraining from using the first set of hardware components.

20. The apparatus of claim 15, the method further comprising:
generating operation sequences to execute operations that render the one or more assumptions incorrect;
inserting one or more additional operations not used to execute the instruction in the aggressive mode; and
forcing an instruction dependency.

21. The apparatus of claim 15, wherein detecting that one of the one or more assumptions is incorrect comprises:
setting a flag to indicate that the detected assumption of the one or more assumptions is incorrect.

22. The apparatus of claim 15, wherein detecting that one of the one or more assumptions is incorrect further comprises:
identifying, from a set of assumptions, an identified incorrect assumption.

23. The apparatus of claim 22, the method further comprising:
selecting, based on the identified incorrect assumption, the conservative mode from a set of conservative modes, wherein the conservative mode does not make the identified incorrect assumption.

24. The apparatus of claim 15, the method further comprising:
identifying, from a set of assumptions, one or more assumptions that are likely to be incorrect; and
selecting, based on the identified one or more assumptions that are likely to be incorrect, the conservative mode from a set of conservative modes, wherein each conservative mode of the set of conservative modes makes a different combination of assumptions, and the conservative mode does not make the one or more assumptions that are likely to be incorrect.

25. The apparatus of claim 15, the method further comprising:
fetching a third instruction; and
executing, based at least in part on fetching the third instruction and before transitioning to the third mode, the third instruction in the conservative mode.

26. The apparatus of claim 15, wherein:
the third mode is the aggressive mode.

27. The apparatus of claim 15, wherein:
the one or more assumptions correspond to assuming that the execution of the instruction will not involve: (i) detecting any exceptions; (ii) accessing input/output memory; (iii) a value of zero in a first register; (iv) a non-zero value in a second register; (v) read-after-read ordering violations; or (vi) a combination thereof.

28. A method for executing an instruction using one or more processors, comprising:

fetching the instruction for execution in an aggressive mode, wherein the aggressive mode operates using a set of assumptions regarding the instruction;

detecting that at least one first assumption of the set of assumptions is incorrect by at least one of: (i) evaluating the instruction before execution of the instruction; (ii) evaluating a state of the one or more processors after partial execution of the instruction in the aggressive mode; and (iii) evaluating a state of the one or more processors after full execution of the instruction in the aggressive mode;

transitioning, based at least in part on detecting that the at least one first assumption of the set of assumptions is incorrect, the one or more processors to a conservative mode, wherein the conservative mode operates without at least one second assumption of the set of assumptions; and executing, based at least in part on transitioning the one or more processors to the conservative mode, the instruction in the conservative mode;

wherein the set of assumptions correspond to assuming that the execution of the instruction will not involve: (i) detecting any exceptions; (ii) accessing input/output memory; (iii) a value of zero in a first register; (iv) a non-zero value in a second register; (v) read-after-read ordering violations; or (vi) a combination thereof.

29. A method for executing an instruction using a processor, comprising:

fetching the instruction for execution in an aggressive mode, wherein the aggressive mode operates using one or more assumptions regarding the instruction;

detecting that one of the one or more assumptions is incorrect by one of: (i) evaluating the instruction with decode logic; and (ii) evaluating a state of the processor after execution of the instruction in the aggressive mode;

selecting a conservative mode from a set of conservative modes, wherein each conservative mode of the set of conservative modes are associated with a different combination of features, wherein the features include a combination of: (i) decomposing memory instructions into small pieces; (ii) forcing memory instructions to be executed in sequence; (iii) allowing updates to processor states; and (iv) merging old data and new data in a register file or a configuration register; and in response to detecting that one of the one or more assumptions is incorrect: (i) cancelling the execution of the instruction if one of the one or more assumptions was detected to be incorrect by evaluating the instruction with decode logic; (ii) transitioning the processor to the selected conservative mode; and (iii) executing the instruction in the conservative mode;

wherein the conservative mode operates without at least one of the one or more assumptions.

30. An apparatus comprising:

one or more processors; and a non-transitory computer-readable medium storing instructions which, when executed by the one or more processors cause the one or more processors to conduct a method for executing an instruction, the method comprising:

fetching the instruction for execution in an aggressive mode, wherein the aggressive mode operates using one or more assumptions regarding the instruction;

detecting that one of the one or more assumptions is incorrect by one of: (i) evaluating the instruction with decode logic; and (ii) evaluating a state of the one or more processors after execution of the instruction in the aggressive mode; and in response to detecting that one of the one or more assumptions is incorrect: (i) cancelling the execution of the instruction if one of the one or more assumptions was detected to be incorrect by evaluating the instruction with decode logic; (ii) transitioning the one or more processors to a conservative mode; and (iii) executing the instruction in the conservative mode;

wherein the conservative mode operates without at least one of the one or more assumptions; and wherein the one or more assumptions correspond to assuming that the execution of the instruction will not involve: (i) detecting any exceptions; (ii) accessing input/output memory; (iii) a value of zero in a first register; (iv) a non-zero value in a second register; (v) read-after-read ordering violations; or (vi) a combination thereof.

* * * * *